(12) United States Patent
Schiess et al.

(10) Patent No.: US 11,084,662 B2
(45) Date of Patent: Aug. 10, 2021

(54) TRANSFER APPARATUS AND METHOD FOR TRANSFERRING ARTICLES

(71) Applicant: SIEMENS SKTIENGESELLSCHAFT, Munich (DE)

(72) Inventors: Tim Schiess, Constance (DE); Sebastian Hahn, Gremsdorf (DE); Nikolaus Haselberger, Radolfzell-Markelfingen (DE); Carsten Aschpurwis, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/607,862

(22) PCT Filed: Apr. 10, 2018

(86) PCT No.: PCT/EP2018/059134
§ 371 (c)(1),
(2) Date: Oct. 24, 2019

(87) PCT Pub. No.: WO2018/197201
PCT Pub. Date: Nov. 1, 2018

(65) Prior Publication Data
US 2020/0189856 A1 Jun. 18, 2020

(30) Foreign Application Priority Data
Apr. 24, 2017 (EP) .................................... 17000697

(51) Int. Cl.
*B65G 43/08* (2006.01)
*B07C 1/02* (2006.01)
(Continued)

(52) U.S. Cl.
CPC ............... *B65G 43/08* (2013.01); *B07C 1/02* (2013.01); *B65G 47/5104* (2013.01);
(Continued)

(58) Field of Classification Search
CPC .... B65G 43/08; B65G 47/5104; B65G 47/57; B65G 47/682; B65G 47/69; B65G 47/46;
(Continued)

(56) References Cited

U.S. PATENT DOCUMENTS 3,747,781 A * 7/1973 Daigle .................. B65G 47/50
198/463.3
7,390,986 B2 6/2008 McDonald
(Continued)

FOREIGN PATENT DOCUMENTS

CN 101128268 A 2/2008
CN 102430530 A 5/2012
(Continued)

*Primary Examiner* — Gene O Crawford
*Assistant Examiner* — Lester Ill Rushin
(74) *Attorney, Agent, or Firm* — Laurence Greenberg; Werner Stemer; Ralph Locher (57) ABSTRACT

A transfer apparatus contains a conveying unit, a sorting unit, which is configured for receiving and sorting articles from the conveying unit, and a transfer unit with a feeding unit. The transfer unit forms a transporting connection between the conveying unit and the sorting unit. A discharging unit is positioned on a portion of the conveying unit and is configured to discharge an article onto the transfer unit only when the article is at a predefined minimum distance from a previously discharged article.

10 Claims, 5 Drawing Sheets

(51) Int. Cl.
  *B65G 47/51* (2006.01)
  *B65G 47/57* (2006.01)
  *B65G 47/68* (2006.01)
  *B65G 47/69* (2006.01)
  *B65G 47/46* (2006.01)
  *B65G 47/42* (2006.01)

(52) U.S. Cl.
  CPC ............ *B65G 47/57* (2013.01); *B65G 47/682* (2013.01); *B65G 47/69* (2013.01); *B65G 47/42* (2013.01); *B65G 47/46* (2013.01); *B65G 2203/0208* (2013.01); *B65G 2203/0233* (2013.01); *B65G 2203/042* (2013.01)

(58) Field of Classification Search
  CPC ............ B65G 47/42; B65G 2203/0208; B65G 2203/0233; B65G 2203/425; B07C 1/02
  USPC .......................................... 198/347
  See application file for complete search history.

(56) References Cited

U.S. PATENT DOCUMENTS

| | | | |
|---|---|---|---|
| 8,954,182 B2 | 2/2015 | Okamoto et al. | |
| 9,150,362 B2* | 10/2015 | Vegh | G05B 19/4189 |
| 9,630,731 B2 | 4/2017 | Toro | |
| 2007/0203612 A1* | 8/2007 | Mileaf | B07C 5/36 |
| | | | 700/216 |
| 2014/0081446 A1 | 3/2014 | Kim | |
| 2014/0091015 A1* | 4/2014 | Kim | B07C 5/00 |
| | | | 209/584 |
| 2014/0365002 A1* | 12/2014 | Nichols | B65G 47/48 |
| | | | 700/240 |

FOREIGN PATENT DOCUMENTS

| | | |
|---|---|---|
| CN | 104174599 A | 12/2014 |
| GN | 104854006 A | 8/2015 |
| JP | S5699123 A | 8/1981 |

* cited by examiner

TRANSFER APPARATUS AND METHOD FOR TRANSFERRING ARTICLES

BACKGROUND OF THE INVENTION

Field of the Invention

The present invention relates to a transfer apparatus and a method for transferring articles.

Transfer apparatuses for transferring articles such as packages or tool parts onto a sorting unit are known. Here the problem often arises that, even at average throughputs (e.g. 3 kpph) in today's feeders in sorting units, situations occur that drive the medium-term throughput significantly below the rated throughput of a feeder. If stoppages occur regularly on account of a lack of free spaces on the sorting unit, it is necessary to stop not only the feeder but also the entire conveyor system that supplies it. If the throughput is increased, the succession of articles per line section must become higher. If stoppages then occur here, unfavorable concentrations will inevitably arise, which must then be resolved when the system is restarted (traffic jam phenomenon in road traffic). This operation costs time and brings with it a phase of considerably reduced throughput. More difficulty is caused by the fact that the usable accelerations for light goods are low if uncontrolled sliding is to be avoided.

SUMMARY OF THE INVENTION

The object consists in developing a transfer apparatus and a method for transferring with an improved throughput.

The transfer apparatus for transferring articles here comprises a conveying unit for conveying articles. The transfer apparatus further comprises a sorting unit, which is designed for receiving and sorting articles from the conveying unit. The transfer apparatus further comprises a transfer unit, which forms a transporting connection between the conveying unit and the sorting unit. The transfer apparatus further comprises a discharging unit, which is positioned on a portion of the conveying unit and is designed to discharge an article onto the transfer unit only when said article is at a predefined minimum distance from a previously discharged article. The transfer unit further comprises a feeding unit, which is designed to convey the articles onto a free space of the sorting unit determined for the article.

The invention has the advantage that, by means of the discharging unit, it is possible to make a certain selection of articles to be guided via the transfer unit to the sorting unit. With the specific distance prerequisite, it is possible to ensure that the distance between the articles on the feeding unit itself enables problem-free braking and acceleration. This serves as the basis for achieving an improved throughput of the transfer apparatus. This also relieves the load on the feeding unit, as it no longer has to perform this task (no exception handling). Articles can be packages, tools, items of baggage or similar, for instance. Here, a feeding unit can be an HSI (high-speed injector), which comprises for instance individual belt cells on which articles can be placed. A sorting unit can be a sorter, for instance. In particular, this can be a cross-belt sorter.

The discharging unit is preferably designed to discharge into the transfer unit only those articles which do not exceed a certain size. In this way, for instance, small articles can be selected out for the sorting unit.

The discharging unit can be designed to discharge articles onto the transfer unit only if the feeding unit has issued a release to this effect. In this way, a further inflow of articles onto the feeding unit is reduced. Only the articles which have already been introduced must then initially be handled. The risk of congestion on the transfer unit is reduced.

The discharging unit is preferably designed not to discharge any articles into the transfer unit if no free space on the sorting unit can be assigned by the feeding unit for an article. In other words, the supply is stopped if no free space can be accessed on the sorting unit in an available time window.

The feeding unit is preferably designed in such a way that an article for which no free space can be assigned on the sorting unit is positioned on a defined holding position on the feeding unit upstream of the sorting unit. In this way, articles can be stored temporarily on the feeding unit. Here, the inflow onto the transfer unit is then reduced accordingly so that no overloading of the transfer unit results.

The feeding unit can be designed in such a way that an article positioned on the feeding unit is conveyed by means of the feeding unit when a free space is reachable on the same. The articles are therefore stored only until a free space can be assigned once again by the feeding unit. In this way, an optimization is achieved.

The feeding unit can comprise a measurement device, which is designed to measure the size and position of the article at varying speeds. In other words, the articles can be measured dynamically. Such a measurement device can be a measurement light curtain. This means that shape and position can be determined even at different or varying measurement speeds. If the system is braked, for instance, the corresponding formats of the articles can then continue to be determined, it being possible for instance on this basis to determine a free space on the sorting unit.

The transfer unit can have an angle of less than 70°, preferably less than 55°, more preferably less than 40° with the sorting unit. In this way, the speeds of the articles can be matched appropriately to the speed of the sorting unit.

Furthermore, a method for transferring articles is proposed, comprising the steps: providing a conveying unit for conveying articles. A sorting unit is then provided, which is designed for receiving and sorting articles from the conveying unit. A transfer unit is then provided, which forms a transporting connection between the conveying unit and the sorting unit. A feeding unit is then provided, which is designed to convey the articles onto a free space of the sorting unit determined for the article. Articles are then conveyed along the conveying unit. Selected articles are then discharged by means of a discharging unit into the transfer unit, which is positioned on a portion of the conveying unit and is designed to discharge an article onto the transfer unit only when said article is at a predefined minimum distance from a previously discharged article. Determining a free space on the sorting unit for a discharged article and conveying the article by means of the feeding unit onto the free space determined.

The above-described properties, features and advantages of this invention and the manner in which these are achieved will be described more clearly and explicitly with the following description of the exemplary embodiments, which are explained in more detail with the drawings, in which:

DESCRIPTION OF THE INVENTION

Figure 1:
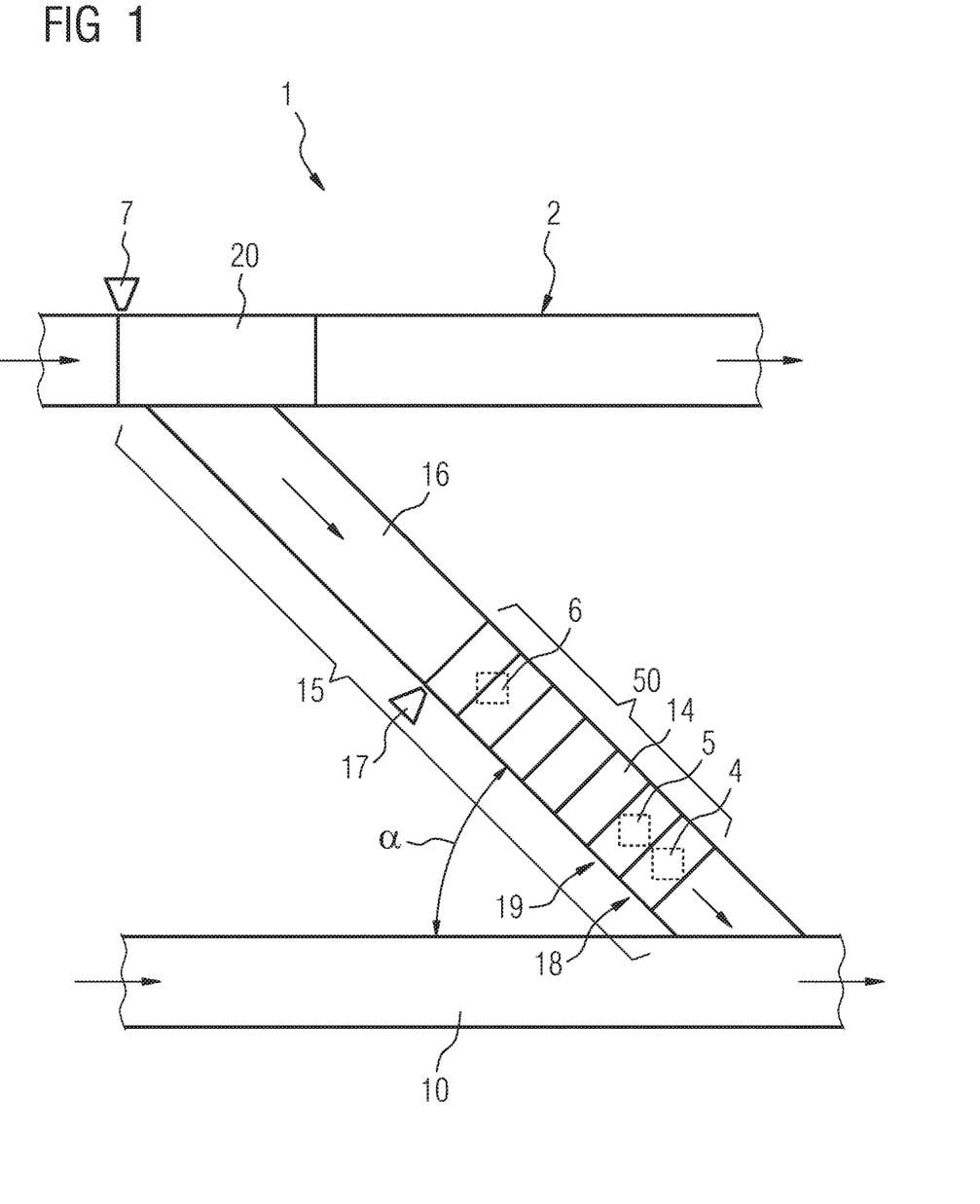
FIG. 1 shows a transfer apparatus according to a preferred embodiment variant.

FIG. 1 shows a transfer apparatus 1 according to the invention. Here, the transfer apparatus 1 comprises a conveying unit 2, which is designed to convey articles. These articles 4, 5, 6 are transported for instance by the conveying unit 2 at a certain first conveying speed. This conveying unit 2 is for instance the main line of a conveyor system, in which for instance a large number of articles 4, 5, 6 of different kinds is conveyed. Articles 4, 5, 6 are conveyed on this conveying unit 2 in the direction of the arrows, for instance. The transfer apparatus 1 further comprises a sorting unit 10.

Corresponding articles 4, 5, 6 are to be received and sorted into this sorting unit 10 from the conveying unit 2. The sorting unit 10 has a second conveying speed, for instance, with the transport also taking place in a direction of the arrows purely by way of example. To this end, the sorting unit 10 has a large number of spaces available. Such free spaces can be embodied for instance by trays, without the invention being limited to this. A sorting unit 10 can be a sorter, for instance. In specific terms, this can for instance be a cross-belt sorter, without the invention being limited to this.

The transfer apparatus 1 further comprises a transfer unit 15, which forms a transporting connection between the conveying unit 2 and the sorting unit 10. Via this transfer unit 15, articles 4, 5, 6 can then be supplied to the sorting unit 10 and received and sorted into the free spaces made available.

To this end, the transfer unit 15 comprises a feeding unit 50, which is designed to convey the articles 4, 5, 6 onto a free space on the sorting unit 10 determined for the article 4, 5, 6. Such a feeding unit 50 can be what is known as an HSI (high-speed injection) or also a high-speed injector. In other words, a feeding unit 50 is an input station, which conveys the incoming articles 4, 5, 6 onto the free spaces of the sorting unit 10 as appropriate. The feeding unit 15 consists here for instance of individual belts 14 or belt cells, which can be accelerated as a function of the free space determined so that the article 4, 5, 6 can be fed into a free space of the sorting unit 10. Here the speed is increased for instance to a synchronous speed, which is compatible with the second conveying speed of the sorting unit 10, for placing into storage.

Furthermore, a discharging unit 20 is positioned on a portion of the conveying unit 2. This discharging unit 20 is provided here for discharging articles 4, 5, 6 onto the transfer unit 15. In particular, a discharging unit 20 can be designed in such a way that only articles 4, 5, 6 fulfilling a certain condition are discharged. For this purpose, the discharging unit 20 further has a measurement unit 7. Here, only articles 4, 5, 6 having a predefined minimum distance from a previously discharged article 4, 5, 6 are discharged by the discharging unit 20. With the specific distance prerequisite, it is possible to ensure that the distance between the articles 4, 5, 6 on the feeding unit 50 enables problem-free braking and acceleration. This forms a starting point for a flexible handling of the articles 4, 5, 6 on the transfer unit 15 and serves as the basis for achieving an improved throughput of the transfer apparatus 1. This also relieves the load on the feeding unit 50, as it no longer has to perform this task.

In this preferred embodiment variant, the discharging unit can also be designed in such a way that only certain sizes or formats of articles 4, 5, 6 are discharged into the transfer unit 15. In this way, for instance, only correspondingly small articles 4, 5, 6 can be discharged into the transfer unit 15. Articles 4, 5, 6 that are too large for the sorting unit 10 do not then for instance cause a fault in the measurement device 17 or possibly a standstill on the feeding unit 50.

Articles 4, 5, 6 that are not diverted by the discharging unit 20 into the transfer unit 15 can simply be conveyed further along the conveying unit 2 and supplied to a corresponding recirculation as appropriate.

The discharging unit 20 is preferably also designed in such a way that it only supplies articles 4, 5, 6 into the transfer unit 15 and thus to the feeding unit 50 if the feeding unit 50 issues a release to this effect. For example, a release can be denied if no free space that can be reached by means of the feeding unit 50 can be determined in a certain time window for an article 4, 5, 6. In this way, an overfilling of the transfer unit 15 and in particular of the feeding unit 50 can be reduced. The articles 4, 5, 6 that are not fed in can then simply continue to be conveyed on the transfer unit 2 without the entire system being disrupted. The feeding unit 50 then advantageously has to process only fewer articles 4, 5, 6.

Here, the detection of a case in which no space is found in a certain time window can work as follows. In the specific embodiment, the transfer unit 15 further comprises by way of example a conveying portion 16, which embodies for example a freely defined conveying route. On this conveying portion 16, for instance, several articles 4, 5, 6 can be conveyed at a typically constant speed in the normal case. These can also be tracked on this conveying portion 16 in other embodiments.

At the transition from the conveying portion 16 to the feeding unit 50, there is for instance a measurement device 17, in particular a measurement light curtain, which is preferably designed to precisely measure the format and position of the respective article 4, 5, 6. On the basis of this information, for instance, a request regarding the timing for a reachable free space for the respective article 4, 5, 6 is issued to the feeding unit 50, which either assigns or does not assign this a free space. If a free space has been found, the feeding unit 50 can calculate an individually calculated acceleration profile and feed in or convey the article 4, 5, 6 to the free space of the sorting unit 10.

In this particular embodiment, the feeding unit 50 is further designed in such a way that an article 4, 5, 6 for which no free space can be determined in the correspondingly available time window is positioned on a defined holding position 18, 19 on the feeding unit 50 upstream of the sorting unit 10. At the same time, as described above, an inflow of further articles 4, 5, 6 into the transfer unit 15 is prevented by withdrawing the release from the discharging unit 20.

Furthermore, a braking of the conveying portion can take place to relieve the load on the feeding unit 50. Preferably, however, this does not take place until an article 4, 5, 6 currently being discharged in the discharging unit 20 has actually been discharged onto the transfer unit 15. Only then does the braking take place, so as to avoid problems at the interface between discharging unit and transfer unit.

During the braking procedure, the articles 4, 5, 6 without a free space are preferably placed into storage on the holding positions 18, 19. These holding positions 18, 19 on the feeding unit 50 are preferably positioned here in such a way that they are located close to the sorting unit 10, a sufficiently long line segment nevertheless being made available so that the stored article 4, 5, 6, once it can again be assigned a free space, can be accelerated or synchronized sufficiently by means of the feeding unit 50. In the present figure, two articles 5, 6 are placed into storage at such holding positions 18, 19, for instance. Here, two articles 4, 5, 6 are accordingly positioned one after the other on different holding positions 18, 19 or belt cells of the feeding unit 50.

During the braking time, it is possible for instance for further articles, here the article 6, to be guided through the measurement device 17, preferably a measurement light curtain, during braking. For this purpose, the measurement device 17 is designed to measure the article dynamically, in other words measure the position and shape of the article correctly even during braking or at varying speeds. To this end, for instance, the individual belts in the area are braked synchronously and accordingly have the same speed at any time.

As soon as free spaces are once again available, acceleration preferably takes place to return to normal operation. A release is then also issued once again to the discharging unit 20, so that selected articles can be transferred once again via the discharging unit 20 into the transfer unit 15.

In order to enlarge the time window for finding a free space on the sorting unit 10, the feeding unit 50 can assume not only a measurement speed, a synchronous speed, but also a peak speed lying above this and a defined speed below the measurement speed. This last speed defines the minimum distance for discharging on the discharging unit 20. The peak speed makes it possible to catch up with a free space on the sorting unit 10 which has just traveled past. If a different speed is assumed on the constant length of the feeding unit 50, the article 4, 5, 6 is sooner or later at a constantly traveling sorting unit 10. As a result of the greater splitting of the possible speeds, without forcing the subsequent articles to brake, it is possible to choose between more spaces than in the standard case.

The transfer unit 15 purely by way of example makes an angle α of 30° with the sorting unit 10, without the invention being limited to this. In this way, the speeds of the articles 4, 5, 6 can be matched appropriately to the speed of the sorting unit 10.

Figures 2, 2A:
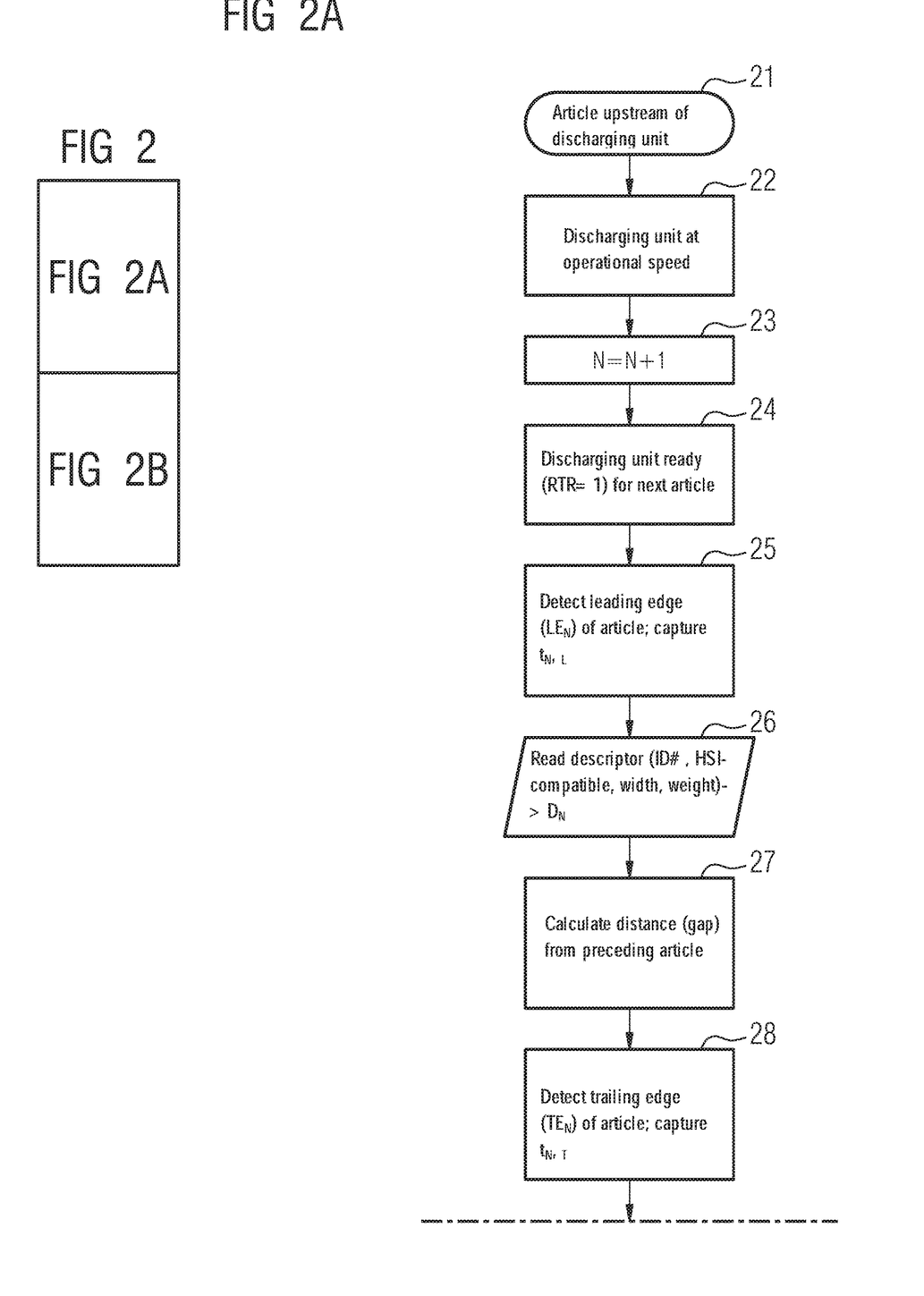
FIGS. 2, 2A and 2B show a program flowchart of a discharging unit according to an exemplary embodiment.
Figure 2B:
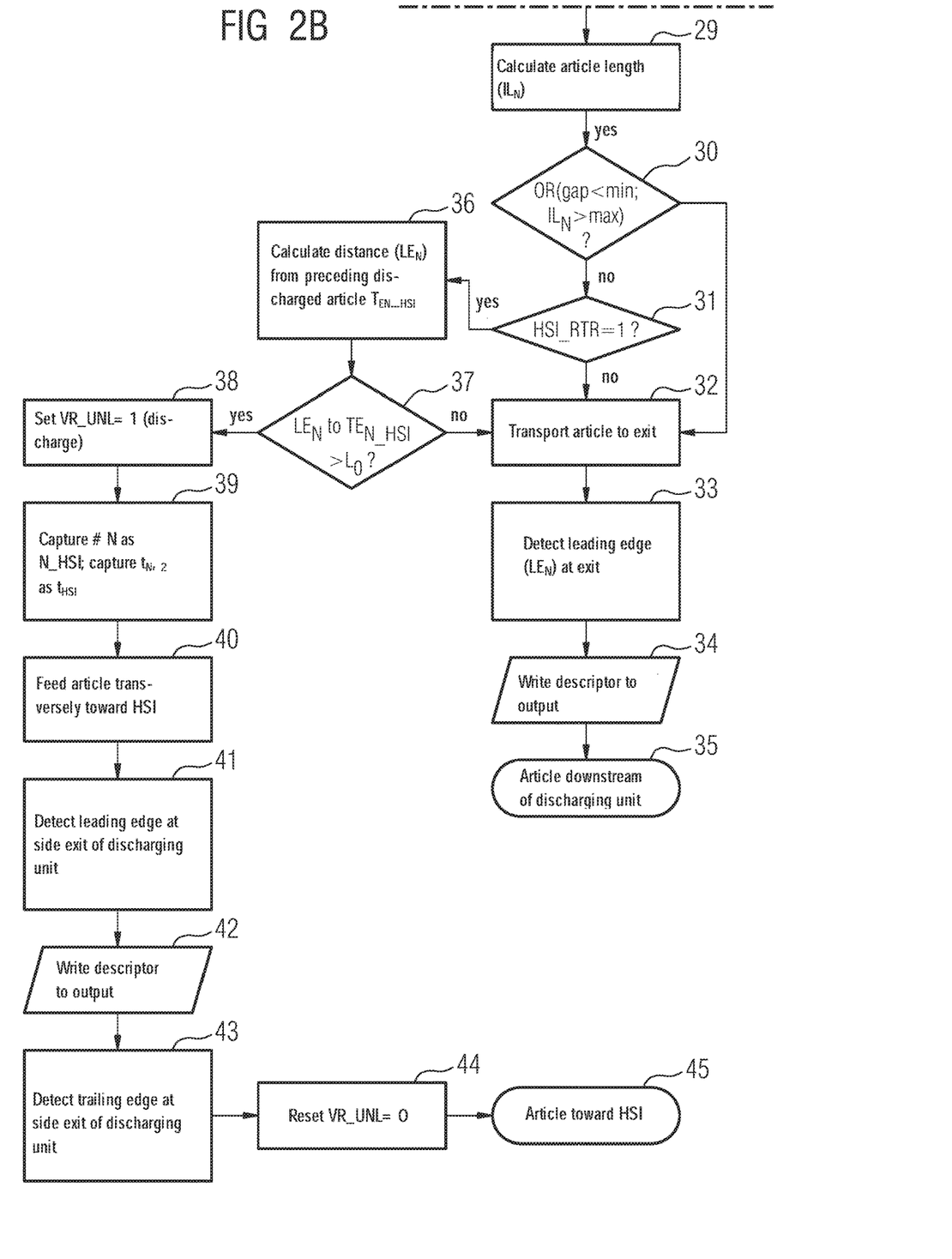

FIG. 2 shows a highly detailed program flowchart of a discharging unit 20 according to an exemplary embodiment. Many of the individual process steps here are shown purely by way of example.

In an exemplary first process step 21 as the start, an article 4, 5, 6 is located upstream of the discharging unit 20. In an exemplary second process step 22, a discharging unit operating speed is determined. In an exemplary third process step 23, a counter for the article 4, 5, 6 to be received is incremented. In an exemplary fourth process step 24, the discharging unit 20 is ready to receive a subsequent article 4, 5, 6.

In an exemplary fifth process step 25, the leading edge of the incoming article 4, 5, 6 is captured at the entry of the discharging unit 20, wherein a fixed entry time is determined. In an exemplary sixth process step 26, saved data of the preceding article is read. From this data and the measured time and the speed of the discharging unit 20, the distance between this article 4, 5, 6 and a preceding article is then determined in a seventh process step 27. Furthermore, in an eighth process step 28, the trailing edge of the article 4, 5, 6 can be captured. In an exemplary ninth process step 29, the length of the article 4, 5, 6 can be determined therefrom.

In an exemplary tenth process step 30, it is possible to check whether the distance between the consecutive articles 4, 5, 6 is smaller than a predefined minimum distance or whether the length of the article 4, 5, 6 is greater than a predefined maximum length. If at least one of the two queries is fulfilled, the article 4, 5, 6 can be conveyed to the exit while remaining on the conveying unit 2 in a twelfth process step 32. Accordingly, the article 4, 5, 6 is then not discharged.

If no condition is met, in other words the respective distance is greater than the predefined minimum distance and the length is smaller than the maximum length, then it is possible to check for instance in an exemplary eleventh process step 31 whether the feeding unit issues the release. If this is not the case, the article 4, 5, 6 can also be conveyed to the exit while remaining on the conveying unit 2 in the exemplary twelfth process step 32.

If the release is issued, the distance between the last discharged article 4, 5, 6 and the present article 4, 5, 6 is measured in a sixteenth process step 36 and, in a seventeenth process step 37, is greater than a minimum distance. If this is not the case, the article 4, 5, 6 is also conveyed to the exit while remaining in the direction of the conveying unit 2 in a twelfth process step 32.

In an exemplary thirteenth process step 33, the leading edge of this article 4, 5, 6 being conveyed to the exit while remaining in the direction of the conveying unit 2 is then detected and, in an exemplary fourteenth process step 34, is written to a descriptor. In an exemplary fifteenth process step 35, an output can take place that the article 4, 5, 6 has been guided past along the discharging unit 20 while remaining on the conveying unit 2.

In the event that there is a sufficient distance between the article 4, 5, 6 and the preceding discharged article 4, 5, 6, the discharging unit 20 is activated in an exemplary eighteenth process step 38. In an exemplary nineteenth process step 39, the discharged article can then be recorded and its entry time captured.

After an exemplary twentieth process step 40, the discharging unit 20 can then for example rotate, so that the selected article can be discharged in the direction of the feeding unit.

In an exemplary twenty-first process step 41, the leading edge of the article 4, 5, 6 can be captured at the exit. In an exemplary twenty-second process step 42, a data output can take place. In an exemplary twenty-third process step 43, the trailing edge can be captured at the exit of the discharging unit 20. In a twenty-fourth process step 44, the discharging unit 20 is then deactivated again or placed in the normal state. As the twenty-fifth process step, the article 4, 5, 6 is finally located on the transfer unit 15.

Figures 3, 3A:
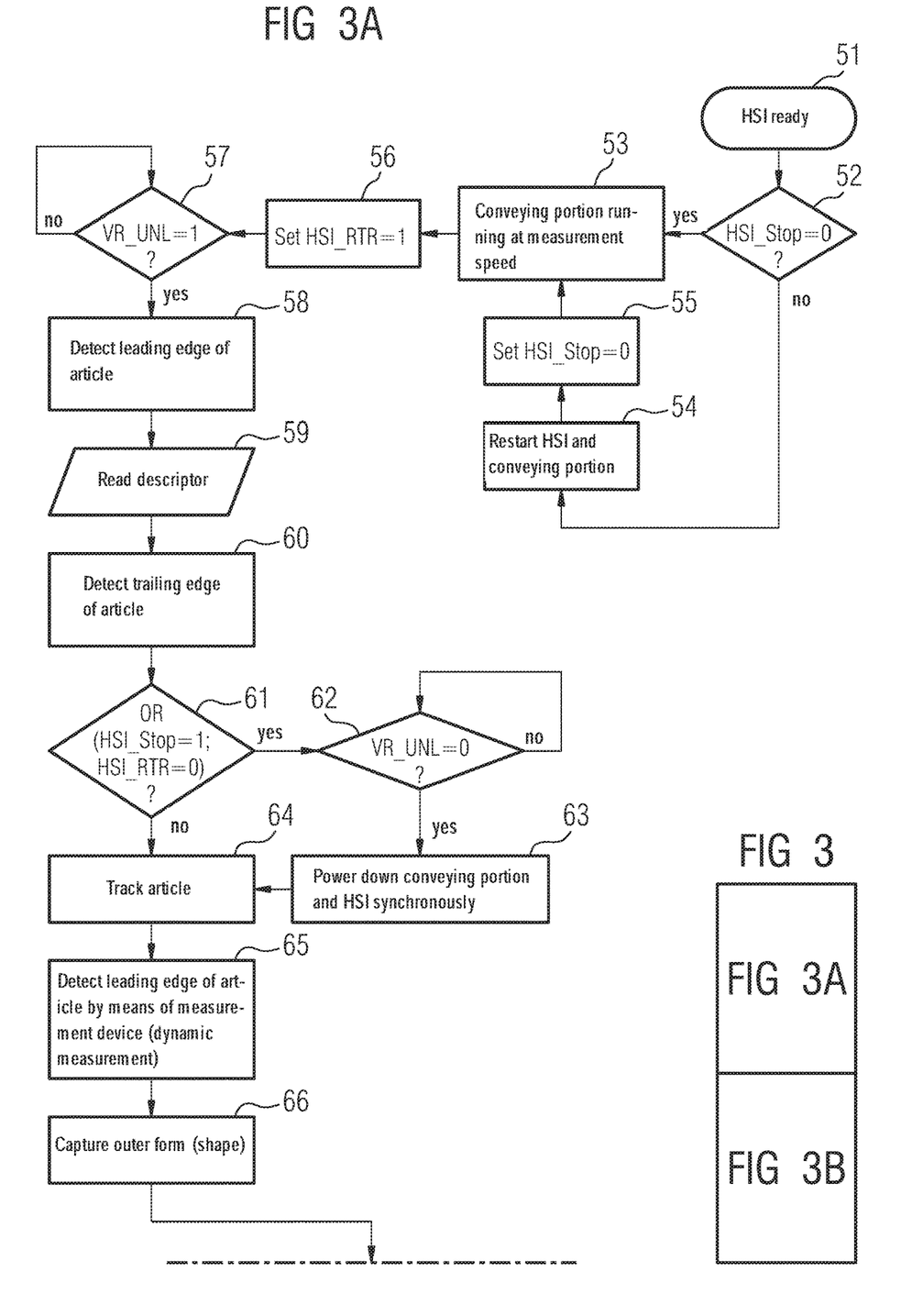
FIGS. 3, 3A and 3B show a program flowchart of a feeding unit according to an exemplary embodiment.
Figure 3B:
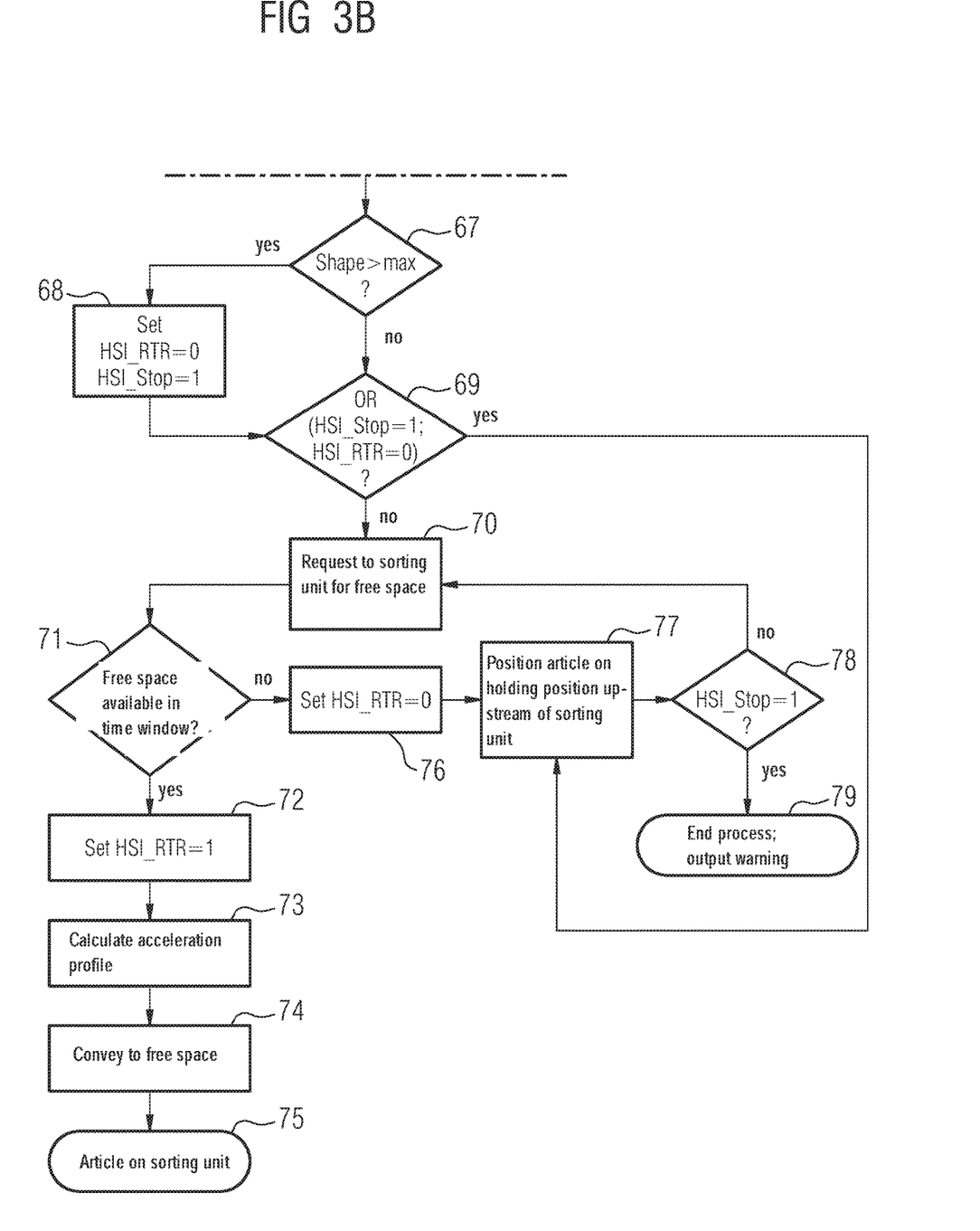

FIG. 3 shows an exemplary program flowchart of a feeding unit 50 according to an exemplary embodiment. The highly detailed program flow chart, which is shown purely by way of example, is described below.

In an exemplary first process step 51, the feeding unit 50 is started. In an exemplary second process step 52, it is possible to check that the feeding unit 50 has not stopped. If it has not stopped, an average speed of a conveying portion 16 can be set in a third exemplary process step 53.

If it has stopped, then the feeding unit 50 and the conveying portion 16 can be restarted in an exemplary fourth process step 54, the stop then being canceled in an exemplary fifth process step 55.

In an exemplary sixth process step 56, the feeding unit 50 is made ready. In an exemplary seventh process step 57, a check is made to determine whether the discharging unit 20 is active, in other words whether an article 4, 5, 6 is currently being discharged from the discharging unit 20. If not, this query is repeated.

If so, the leading edge of the article 4, 5, 6 is detected in an exemplary eighth process step 58. Data is read out in an exemplary ninth process step 59. The trailing edge of the article 4, 5, 6 can be detected in an exemplary tenth process step 60.

In an exemplary eleventh process step 61, a check can be made to determine whether the feeding unit 50 has stopped or whether the feeding unit 50 is not ready. If neither of these cases is true, then the article 4, 5, 6 can be tracked on the conveying portion 16 in an exemplary fourteenth process step 64.

If one of these two cases is true, then preferably a check can be made in a twelfth process step 62 to determine whether the discharging unit 20 is deactivated. If not, then this can be rechecked. Then, in an exemplary thirteenth sorting step 63, the conveying speed of the conveying portion 16 and of the first element of the feeding unit 50 is reduced synchronously, it then also being possible to track the article 4, 5, 6 on the conveying portion 16 in the exemplary fourteenth process step 64. The remaining elements of the feeding unit 50 can be controlled systematically as required in accordance with the process shown.

In an exemplary fifteenth process step 65, the article 4, 5, 6 can be measured in a dynamic measurement by means of a measurement device 17, in particular a measurement light curtain. The article 4, 5, 6 which has been slowed down or an article 4, 5, 6 with a varying speed can also be measured here on account of the dynamic measurement.

In an exemplary seventeenth process step 66, the external format or the external shape can also be measured. In an exemplary seventeenth process step 67, a further check can be made to determine whether the size exceeds a predefined maximum size. If this size is not exceeded, the oversized article 4, 5, 6 can now once again be checked in an exemplary nineteenth process step 69 to determine whether the feeding unit 50 is not ready or has stopped. If neither of these cases is true, in other words the feeding unit 50 is ready, then a request can be made for a free space on the sorting unit 10 in an exemplary twentieth process step 70. In an exemplary twenty-first process step 71, a check can then be made to determine whether the free space is reachable in the available time window. If so, the feeding unit 50 can be activated in a twenty-second step 72 and an individual acceleration profile determined in an exemplary twenty-third step 73. Then, in an exemplary twenty-fourth process step 74, the article 4, 5, 6 can be induced or fed into the envisaged free space. In an exemplary twenty-fifth process step 75, the article 4, 5, 6 is then in its available space on the sorting unit 10.

If, in the exemplary twenty-first process step 70, no free space is available that can be reached in a certain time window, the feeding unit 50 can be deactivated in an exemplary twenty-sixth process step 76 and the article 4, 5, 6 placed on a holding position 18, 19 upstream of the sorting unit 10 in an exemplary twenty-seventh process step 77.

In the case of the exemplary seventeenth process step 67, too, if an article 4, 5, 6 is identified as oversized, this can be placed on such a holding position 18, 19 upstream of the sorting unit 10 by way of an exemplary eighteenth process step 68 and a nineteenth process step 69. In an exemplary twenty-eighth process step 78, a check can then be made to determine whether such an oversized article 4, 5, 6 is located on one of the holding positions 18, 19.

If so, then the process can be ended with a warning in an exemplary twenty-ninth process step 79. Here the system can be protected against damages. In this way, safety is built in. If, on the other hand, no such oversized article 4, 5, 6 is located on one of the holding positions 18, 19, a request can be issued to the sorting unit 10 according to the exemplary twentieth process step 70 for one or several such articles 4, 5, 6, which in the case of a positive response reaches one of the respective free spaces by means of the feeding unit 50.

Although the invention has been illustrated and described in detail by preferred exemplary embodiments, the invention is not restricted by the disclosed examples and other variations can be derived herefrom by the person skilled in the art without departing from the scope of protection of the invention.

LIST OF REFERENCE CHARACTERS

1 Transfer apparatus
2 Conveying unit
4 Article
5 Article
6 Article
7 Measurement unit
10 Sorting unit
14 Belts
15 Transfer unit
16 Conveying portion
17 Measurement device
18 Holding position
19 Holding position
α Angle
20 Discharging unit
21 First process step
22 Second process step
23 Third process step
24 Fourth process step
25 Fifth process step
26 Sixth process step
27 Seventh process step
28 Eighth process step
29 Ninth process step
30 Tenth process step
31 Eleventh process step
32 Twelfth process step
33 Thirteenth process step
34 Fourteenth process step
35 Fifteenth process step
36 Sixteenth process step
37 Seventeenth process step
38 Eighteenth process step
39 Nineteenth process step
40 Twentieth process step
41 Twenty-first process step
42 Twenty-second process step
43 Twenty-third process step
44 Twenty-fourth process step
45 Twenty-fifth process step
50 Feeding unit
51 First process step
52 Second process step
53 Third process step
54 Fourth process step
55 Fifth process step
56 Sixth process step
57 Seventh process step
58 Eighth process step 59 Ninth process step
60 Tenth process step
61 Eleventh process step
62 Twelfth process step
63 Thirteenth process step
64 Fourteenth process step
65 Fifteenth process step
66 Sixteenth process step
67 Seventeenth process step
68 Eighteenth process step
69 Nineteenth process step
70 Twentieth process step
71 Twenty-first process step
72 Twenty-second process step
73 Twenty-third process step
74 Twenty-fourth process step
75 Twenty-fifth process step
76 Twenty-sixth process step
77 Twenty-seventh process step
78 Twenty-eighth process step
79 Twenty-ninth process step

The invention claimed is:

1. A transfer apparatus for transferring articles, the transfer apparatus comprising:
a conveyor for conveying the articles;
a sorter configured for receiving and sorting the articles from said conveyor;
a transfer unit forming a transporting connection between said conveyor and said sorter, said transfer unit having a feeder configured to convey the articles onto a free space of said sorter determined for each of the articles; and
a discharging unit positioned on a portion of said conveyor and configured to discharge an article onto said transfer unit only when the article is at a predefined minimum distance from a previously discharged article, said discharging unit is configured to discharge the articles onto said transfer unit only when said feeder has issued a release to this effect.

2. The transfer apparatus according to claim 1, wherein said discharging unit is configured to discharge into said transfer unit only the articles which do not exceed a certain size.

3. The transfer apparatus according to claim 2, wherein said discharging unit is configured not to discharge any of the articles into said transfer unit if no free space on said sorter can be assigned by said feeder for the article.

4. The transfer apparatus according to claim 3, wherein said feeder is configured in such a way that, if a free space is reachable, the article positioned on said feeder is conveyed onto the free space by means of said feeder.

5. The transfer apparatus according to claim 1, wherein said transfer unit has an angle of less than 70° with said sorter.

6. The transfer apparatus according to claim 1, wherein said transfer unit has an angle of less than 55° with said sorter.

7. The transfer apparatus according to claim 1, wherein said transfer unit has an angle of less than 40° with said sorter.

8. A transfer apparatus for transferring articles, the transfer apparatus comprising:
a conveyor for conveying the articles;
a sorter configured for receiving and sorting the articles from said conveyor;
a transfer unit forming a transporting connection between said conveyor and said sorter, said transfer unit having a feeder configured to convey the articles onto a free space of said sorter determined for each of the articles, said feeder configured in such a way that an article for which no free space can be assigned on said sorter is positioned on a defined holding position on said feeder upstream of said sorter; and
a discharging unit positioned on a portion of said conveyor and configured to discharge the article onto said transfer unit only when the article is at a predefined minimum distance from a previously discharged article.

9. A transfer apparatus for transferring articles, the transfer apparatus comprising:
a conveyor for conveying the articles;
a sorter configured for receiving and sorting the articles from said conveyor;
a transfer unit forming a transporting connection between said conveyor and said sorter, said transfer unit having a feeder configured to convey the articles onto a free space of said sorter determined for each of the articles, said feeder having a measurement device configured to measure a size and position of an article at varying speeds; and
a discharging unit positioned on a portion of said conveyor and configured to discharge the article onto said transfer unit only when the article is at a predefined minimum distance from a previously discharged article.

10. A method for transferring articles, which comprises the steps of:
providing a conveyor for conveying the articles;
providing a sorter configured for receiving and sorting the articles from the conveyor;
providing a transfer unit which forms a transporting connection between the conveyor and the sorter;
providing a feeder configured to convey the articles onto a free space of the sorter determined for the article;
conveying the articles along the conveyor;
discharging selected ones of the articles by means of a discharging unit into the transfer unit, wherein the discharging unit is positioned on a portion of the conveyor and is configured to discharge onto the transfer unit only the articles which fulfill a certain condition; and
determining a free space on the sorter for a discharged article and conveying the discharged article by means of the feeder onto the free space determined.

* * * * *